United States Patent
Yan et al.

(10) Patent No.: US 12,058,626 B2
(45) Date of Patent: Aug. 6, 2024

(54) DEVICE CONTROL METHOD AND APPARATUS

(71) Applicant: BEIJING XIAOMI MOBILE SOFTWARE CO., LTD., Beijing (CN)

(72) Inventors: Laijun Yan, Beijing (CN); Bing Zhao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 288 days.

(21) Appl. No.: 17/514,782

(22) Filed: Oct. 29, 2021

(65) Prior Publication Data
US 2022/0279462 A1  Sep. 1, 2022

(30) Foreign Application Priority Data

Feb. 26, 2021 (CN) .................. 202110220221.X

(51) Int. Cl.
*H04W 52/36* (2009.01)
*H04W 8/00* (2009.01)
*H04W 88/16* (2009.01)

(52) U.S. Cl.
CPC ......... *H04W 52/367* (2013.01); *H04W 8/005* (2013.01); *H04W 88/16* (2013.01)

(58) Field of Classification Search
CPC .... H04W 52/367; H04W 8/005; H04W 88/16
USPC ........................................................ 370/318
See application file for complete search history.

(56) References Cited

U.S. PATENT DOCUMENTS

| | | | | |
|---|---|---|---|---|
| 9,565,650 B2 * | 2/2017 | Shan | ................. | H04M 3/02 |
| 9,929,907 B2 * | 3/2018 | Scahill | ................. | H04J 11/0023 |
| 10,021,554 B2 * | 7/2018 | Abraham | ................. | H04W 8/005 |
| 10,142,946 B2 * | 11/2018 | Choi | ................. | H04W 52/242 |
| 10,820,375 B2 * | 10/2020 | Park | ................. | H04L 65/762 |
| 10,849,079 B2 * | 11/2020 | Khati | ................. | H04W 52/146 |
| 10,856,128 B2 * | 12/2020 | Kang | ................. | H04W 72/02 |

(Continued)

FOREIGN PATENT DOCUMENTS

| | | | |
|---|---|---|---|
| CN | 102096096 A | * | 6/2011 |
| CN | 102291674 A | | 12/2011 |

(Continued)

OTHER PUBLICATIONS

Extended European Search Report issued in Application No. 21210268.5, dated Jun. 2, 2022,(9p).

(Continued)

*Primary Examiner* — Melvin H Pollack
(74) *Attorney, Agent, or Firm* — Arch & Lake LLP

(57) ABSTRACT

A device control method and an apparatus are provided. The device control method, applied to a main control device, includes: receiving a control instruction; sending a first signal to candidate controlled devices according to the control instruction; receiving second signals sent by the candidate controlled devices in response to the first signal, where the second signal carries a transmit power value of the candidate controlled device; determining a candidate controlled device corresponding to a minimum signal attenuation value as a target controlled device according to received power values for receiving the second signals by the main control device and the transmit power values of the candidate controlled devices carried in the second signals; and sending the control instruction to the target controlled device.

20 Claims, 4 Drawing Sheets

(56) References Cited

U.S. PATENT DOCUMENTS

| | | | |
|---|---|---|---|
| 10,880,717 B2* | 12/2020 | Xiong | H04L 5/0016 |
| 10,887,851 B1* | 1/2021 | Zhang | H04W 52/46 |
| 10,932,130 B2* | 2/2021 | Chari | H04W 8/005 |
| 10,979,962 B2* | 4/2021 | Ramisetti | H04W 40/22 |
| 10,979,985 B2* | 4/2021 | Martin | H04W 52/46 |
| 11,055,615 B2* | 7/2021 | Litichever | H04L 12/40 |
| 11,172,348 B2* | 11/2021 | Lee | H04B 11/00 |
| 11,265,941 B2* | 3/2022 | Zhang | H04L 7/00 |
| 11,411,683 B2* | 8/2022 | Wu | H04W 74/085 |
| 11,444,668 B2* | 9/2022 | Badic | G01S 5/0284 |
| 11,450,196 B2* | 9/2022 | Daoura | H04W 52/028 |
| 11,558,830 B2* | 1/2023 | Nguyen | H04L 1/1854 |
| 11,563,528 B2* | 1/2023 | Ryu | H04L 5/0055 |
| 11,576,028 B2* | 2/2023 | Lee | H04W 76/14 |
| 11,606,764 B2* | 3/2023 | Noh | H04L 27/2602 |
| 11,632,149 B2* | 4/2023 | Ko | H04B 7/0408 375/267 |
| 11,785,654 B2* | 10/2023 | Ryu | H04W 76/14 370/329 |
| 2013/0079903 A1 | 3/2013 | Kemmann et al. | |
| 2022/0038136 A1* | 2/2022 | Cabrol | H04B 17/336 |
| 2022/0256357 A1* | 8/2022 | Kim | H04W 72/12 |
| 2023/0093016 A1* | 3/2023 | Shi | H04W 48/16 370/329 |

FOREIGN PATENT DOCUMENTS

| | | |
|---|---|---|
| CN | 102388411 A | 3/2012 |
| CN | 104380688 A | 2/2015 |
| CN | 104748314 A | 7/2015 |
| CN | 104767947 A | 7/2015 |
| CN | 104883377 A | 9/2015 |
| CN | 106162444 A | 11/2016 |
| CN | 106341887 A | 1/2017 |
| CN | 107329404 A | 11/2017 |
| CN | 109917663 A1 | 6/2019 |
| CN | 110764049 A | 2/2020 |
| CN | 111025920 A | 4/2020 |
| CN | 111391784 A | 7/2020 |
| CN | 111880855 A | 11/2020 |
| CN | 112116803 A | 12/2020 |
| DE | 102014208016 A1 | 10/2015 |
| EP | 3896537 A1 | 10/2021 |
| WO | WO2008090401 A1 | 7/2008 |
| WO | WO2020155870 A1 | 8/2020 |

OTHER PUBLICATIONS

First CNOA issued on Application No. 202110220221X dated Oct. 20, 2023 with English translation, (11p).

The Second CNOA issued in Application No. 202110220221.X dated Apr. 12, 2024 with English translation, (20p).

* cited by examiner

DEVICE CONTROL METHOD AND APPARATUS

CROSS-REFERENCE TO RELATED APPLICATION

The present application is based upon and claims priority to Chinese Patent Application No. 202110220221.X, filed on Feb. 26, 2021, the entire contents of which are incorporated herein by reference for all purposes.

TECHNICAL FIELD

The present disclosure relates to the technical field of Internet of Things, and in particular, to a device control method and apparatus, a device, and a storage medium.

BACKGROUND

The Internet of Things is an important part of the new generation of information technology, and is also an important development stage in "information" age. The Internet of Things is widely used in the integration of networks through communication perception technologies such as intelligent perception, recognition technology and pervasive computing. Therefore, it is called the third wave of the development of the world's information industry after computers and the Internet.

SUMMARY

According to a first aspect of the disclosure, there is provided a device control method, which is applied to a main control device and includes: receiving a control instruction; sending a first signal to candidate controlled devices according to the control instruction; receiving second signals sent by the candidate controlled devices in response to the first signal, where the second signals carry transmit power values of the candidate controlled devices; determining a candidate controlled device corresponding to a minimum signal attenuation value as a target controlled device according to received power values for receiving the second signals by the main control device and the transmit power values of the candidate controlled devices carried in the second signals; and sending the control instruction to the target controlled device.

According to a second aspect of the present disclosure, there is provided a device control method, which is applied to a controlled device and includes: receiving a first signal sent by a main control device according to a received control instruction; in response to the first signal, sending a second signal to the main control device, where the second signal carries a transmit power value of the controlled device, and the transmit power value is used by the main control device to determine a target controlled device that executes the control instruction from a plurality of controlled devices; and in response to determining that the controlled device is the target controlled device, receiving the control instruction sent by the main control device.

According to a third aspect of the disclosure, there is provided a control apparatus, which is applied to a main control device. The apparatus includes a processor and a memory for storing instructions executable by the processor.

Further, the processor is configured to: receive a control instruction; send a first signal to candidate controlled devices according to the control instruction; receive second signals sent by the candidate controlled devices in response to the first signal, where the second signals carry transmit power values of the candidate controlled devices; determine a candidate controlled device corresponding to a minimum signal attenuation value as a target controlled device according to received power values for receiving the second signals by the main control device and the transmit power values of the candidate controlled devices carried in the second signals; and send the control instruction to the target controlled device.

According to a fourth aspect of the disclosure, there is provided a device control apparatus, which is applied to a controlled device and includes a processor and a memory for storing instructions executable by the processor.

Further, the processor is configured to: receive a first signal sent by a main control device according to a received control instruction; send a second signal to the main control device in response to the first signal; the second signal carries a transmit power value of the controlled device, where the transmit power value is used by the main control device to determine a target controlled device that executes the control instruction from the controlled devices; and in response to determining that the controlled device is the target controlled device, receive the control instruction sent by the main control device.

According to a fifth aspect of the disclosure, there is provided a storage medium, including: when instructions in the storage medium are executed by a processor of a main control device, the main control device can execute the device control method as described in the first aspect; or, when instructions in the storage medium are controlled by a processor of a controlled device, the controlled device can execute the device control method described in the second aspect.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

The Internet of Things is an Internet in which things are connected with things. Generally, when a control device controls a certain type of other device based on the Internet of Things, it is an important issue to select which device to control. For example, if a mobile phone is used for controlling an air conditioner, and there are a plurality of air conditioners in the house, the issue of which air conditioner is controlled needs to be solved.

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are examples of apparatuses and methods consistent with aspects related to the disclosure as recited in the appended claims.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

Figure 1:
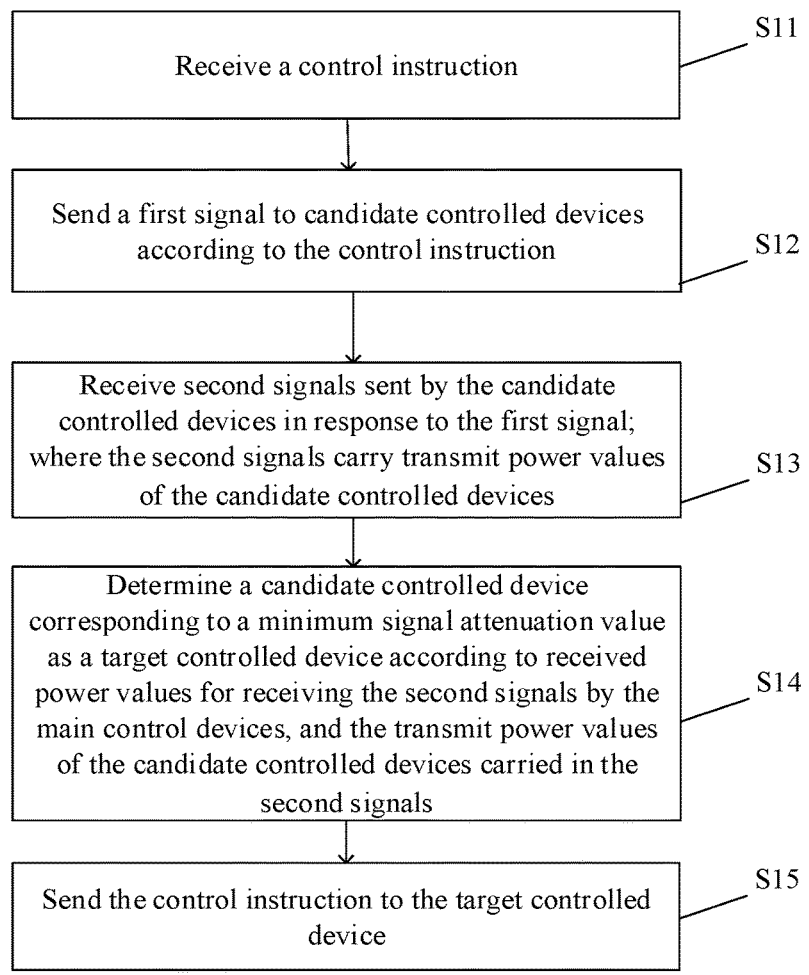
FIG. 1 is a first flowchart of a device control method shown in an embodiment of the disclosure.

FIG. 1 is a first flow chart of a device control method shown in an embodiment of the disclosure, which is applied to a main control device. As shown in FIG. 1, the device control method applied to the main control device includes the following steps.

In S11, a control instruction is received.

In S12, a first signal is sent to candidate controlled devices according to the control instruction.

In S13, second signals sent by the candidate controlled devices in response to the first signal are received; where the second signals carry transmit power values of the candidate controlled devices.

In S14, according to received power values for receiving the second signals by the main control devices, and the transmit power values of the candidate controlled devices carried in the second signals, the candidate controlled device corresponding to a minimum signal attenuation value is determined as a target controlled device.

In S15, the control instruction is sent to the target controlled device.

In the embodiments of the disclosure, the main control device may be a smart device or an Internet of Things household device that a user can carry, such as a smart phone, a smart wearable device, or a smart speaker. The controlled device may be an Internet of Things household device, such as a smart lamp, a smart curtain, or a smart TV.

In step S11, the main control device may receive a control instruction, and the control instruction may be a control instruction generated based on a manual operation of the user, or may be a voice instruction of the user. The control instruction may carry controlled information, for example, the control instruction may carry device type information of the controlled device and/or a function to be executed.

In step S12, the main control device sends a first signal to the candidate controlled devices according to the control instruction.

It should be noted that in the embodiments of the disclosure, there may be a plurality of candidate controlled devices, all of which can execute the control instruction. The main control device sends the first signal to each candidate controlled device that can execute the control instruction. In addition, in the embodiments of the disclosure, the main control device may send the first signal to the candidate controlled devices multiple times according to a time interval, so as to improve the success rate of receiving the first signal by the candidate controlled devices.

In an embodiment, the control instruction carries indication information that represents a device type, and sending the first signal to the candidate controlled devices according to the control instruction includes:

according to the indication information carried in the control instruction, sending the first signal to the candidate controlled devices corresponding to the device type represented by the indication information.

In an embodiment, the indication information may directly indicate type information of the device type.

For example, if the control instruction is "turn on the air conditioner", the "air conditioner" belongs to device type information, and the main control device may send the first signal to all air conditioners in the house.

In another embodiment, the indication information may be indication information that indirectly determines the device type.

For example, if the control instruction is "switch to Hubei station", then the main control device may determine that the device type identification that can perform TV station switching is a TV based on "Hubei station", and thus sends the first signal to all the TVs in the house.

In an embodiment, sending the first signal to the candidate controlled devices includes:

sending the first signal to the candidate controlled devices through access gateways between the main control device and the candidate controlled devices.

In the embodiments of the disclosure, the main control device and the candidate controlled device may access the same local area network through the access gateway, so the main control device may send the first signal to the candidate controlled device through the access gateway. For example, the access gateway is a router or other network device that can provide a network access function.

It should be noted that in the embodiments of the disclosure, the main control device sends the first signal to the candidate controlled devices through the access gateway, the reason of which is as follows: the main control device has control authority for the devices belonging to the same user, and the main control device and the candidate controlled devices connected to the same gateway may belong to the same user, therefore, in the disclosure, the security of device control can be improved by using the access gateway to transfer the first signal when sending the first signal. In the disclosure, the way of the main control device sending the first signal to the candidate controlled device is not limited to the access gateway. For example, the main control device and the candidate controlled devices may also communicate based on Bluetooth communication, Wi-Fi direct connection or D2D communication, or the like.

In step S13, after the main control device sends the first signal to the candidate controlled devices, it may receive the second signals that carry the transmit power values of the candidate controlled devices fed back by the candidate controlled devices, and in step S14, based on the received power values for receiving the second signals by the main control device and the transmit power values of the candidate controlled devices carried in the second signals, the candidate controlled device corresponding to the minimum signal attenuation value is determined as the target controlled device.

As mentioned above, there may be a plurality of candidate controlled devices. Therefore, after the main control device sends the first signal to each candidate controlled device, it may receive the second signals fed back by the plurality of candidate controlled devices and carrying their own transmit power values.

However, when the signal is transmitted in a transmission medium, a part of the energy is converted into heat or absorbed by the transmission medium, which causes the signal strength (power) to be continuously weakened, that is, there is signal attenuation. The degree of signal attenuation is usually related to the transmission distance. The longer the transmission distance is, the larger the attenuation may be; and the shorter the transmission distance is, the smaller the attenuation may be. Therefore, the disclosure may determine the candidate controlled device corresponding to the minimum signal attenuation value as the target controlled device according to the received power values of the second signals and the transmit power values of the second signals. For example, if the candidate controlled device closest to the main control device among the plurality of candidate controlled devices has the smallest signal attenuation value, the candidate controlled device closest to the main control device is determined as the target controlled device.

In an embodiment of the disclosure, the locations of the candidate controlled devices are stored in the main control device, and the method further includes:

obtaining correction values of the signal attenuation values according to the locations of the candidate controlled devices and the relative location information between the candidate controlled devices and the main control device; and correcting the signal attenuation values according to the correction values to obtain the corrected minimum signal attenuation value.

It should be noted that the main control device may determine its current location based on the enabled positioning function, or it may obtain its own location based on the user's settings, so as to determine the relative location information between the location of each candidate controlled device and the main control device.

For example, according to the relative location information, it is determined whether there is any obstruction on a transmission path from any candidate controlled device to the main control device;

when there is obstruction, a correction value corresponding to the obstruction is determined; and the correction value is added to the difference between the transmit power value and the received power value to obtain an attenuation value on the transmission path in which the influence of the obstruction is removed.

The obstruction includes, but is not limited to, walls and/or home furnishings, etc.

For example, the main control device stores that the candidate controlled device A is in the bedroom 1 and the candidate controlled device B is in the bedroom 2, and the main control device determines that it per se is in the living room based on the positioning function. Because there is a wall between the living room and each bedroom, when the main control device determines the signal attenuation corresponding to the candidate controlled device A based on the received second signal of the candidate controlled device A and the signal attenuation value corresponding to the candidate controlled device B based on the received second signal of the candidate controlled device B, the wall will affect the determination. The different coating materials on the wall, etc., make the signal attenuation different. Therefore, the disclosure may obtain the correction value of the signal attenuation value according to the location information of the candidate controlled device and the current location information of the main control device. For example, the main control device may store the signal attenuation coefficients of different walls to obtain the attenuation values of the signal excluded the affection of the wall, so as to accurately locate the target controlled device with the smallest signal attenuation value.

In an embodiment of the disclosure, the first signal includes: a discovery request signal; the second signal includes: a discovery response signal.

Based on the first signal being a discovery request signal (discovery request), the candidate controlled device can send a discovery response signal (discovery response) to the main control device based on the end-to-end device communication mode, that is, the discovery response signal is a signal that is directly fed back to the main control device without being transferred by the transfer device when the candidate controlled device responds to the first signal.

It should be noted that, in the embodiments of the disclosure, when the main control device sends the first signal to the candidate controlled device using the access gateway relay mode, if the candidate controlled device determines that the type of the first signal is a discovery request signal after receiving the first signal, then it may feed back the second signal in an end-to-end device communication mode, and the main control device switches to the end-to-end device communication mode to receive the second signal. However, if the candidate controlled device and the main control device transfer the second signal through the access gateway, there is signal attenuation in the process of sending the second signal to the access gateway by the candidate controlled device, and there is also signal attenuation when forwarding the second signal to the main control device by the access gateway. Therefore, the transmit power value of the second signal received by the main control device cannot accurately reflect the spatial relationship between the main control device and the candidate controlled device, for example, it cannot accurately reflect the distance between the main control device and the candidate controlled device. Therefore, in the disclosure, when the main control device transfers the first signal through the access gateway, the candidate controlled device and the main control device both switch to the end-to-end device communication mode to exchange the second signal, which can improve the accuracy of determining the target controlled device by the main control device.

In an embodiment, the discovery request signal is a discovery request signal of Wi-Fi direct communication; the discovery response signal is a discovery request signal of Wi-Fi direct communication;

or, the discovery request signal is a discovery request signal of D2D communication; the discovery response signal is a discovery response signal of D2D communication.

In this embodiment, the discovery request signal is the discovery request signal of Wi-Fi direct communication, and the discovery response signal is the discovery response signal of Wi-Fi direct communication, that is, the main control device and the candidate controlled device may communicate based on Wi-Fi direct connection technology, and the main control device obtains the second signal sent by the candidate controlled device based on Wi-Fi direct connection.

The discovery request signal may also be the discovery request signal of D2D communication, and the discovery response signal is the discovery response signal of D2D communication, that is, the main control device and the candidate controlled device may perform device-to-device communication based on D2D communication technology, and the main control device obtains the second signal sent by the candidate controlled device based on the D2D communication.

It should be noted that in the embodiments of the disclosure, the minimum signal attenuation value may be determined by a ratio between the transmit power value and the received power value of the second signal. If there is no signal attenuation, the ratio between the transmit power value and the received power value of the second signal should be 1; and if there is signal attenuation, the greater the ratio between the transmit power value and the received power value, the smaller the signal attenuation. Therefore, the candidate controlled device corresponding to the minimum signal attenuation value may be the target controlled device closest to the main control device.

In an embodiment, according to the received power values for receiving the second signals by the main control device and the transmit power values of the candidate controlled devices carried in the second signals, determining the candidate controlled device corresponding to the minimum signal attenuation value to be the target controlled device, includes:

determining differences between the transmit power values and the received power values; and determining the candidate controlled device corresponding to the smallest difference as the target controlled device.

In this embodiment, the differences between the transmit power values and the received power values may also be determined, and the candidate controlled device corresponding to the smallest difference is determined as the target controlled device. The smaller the difference, the less the signal attenuation, and the less signal attenuation may be due to that the main control device and the candidate controlled device are closer.

For example, the second signal sent by each candidate controlled device includes the transmit power value TxPower, and the received power value of the second signal received by the main control device is RxPower, then the power attenuation value FadePower may be obtained by the following formula (1):

$$FadePower = TxPower - RxPower \quad (1)$$

Based on the FadePower corresponding to different candidate controlled devices determined by the main control device, the candidate controlled device corresponding to the smallest difference may be determined as the target controlled device.

In step S15, after the target controlled device is determined, the main control device may send the control instruction to the target controlled device, so that the target controlled device responds to the control instruction.

In an embodiment, the main control device stores device identifiers of the candidate controlled devices, and sending the control instruction to the target controlled device includes:

sending the control instruction to the target controlled device according to the device identifier of the target controlled device.

In the embodiments of the disclosure, the main control device may store the device identifier of each candidate controlled device, and therefore, the control instruction may be sent to the candidate controlled device that is determined as the target controlled device based on the device identifiers of the candidate controlled devices. The device identifier of the target controlled device includes at least one of the following: a device serial number; a Universally Unique Identifier (UUID); and a physical address (Media Access Control Address, MAC). For example, in the disclosure, the main control device has uniquely identified the MAC address of each candidate controlled device.

In one embodiment, when there are a plurality of devices of the same type (such as a plurality of air conditioners) in the house and the mobile phone controls the air conditioner, the user is required to provide the specific name of the air conditioner to the mobile phone. If the user instructs the mobile phone to "turn on the air conditioner" in a room, even though there is one air conditioner in this room, the mobile phone does not know which air conditioner to turn on, and then a list of all air conditioners in the house will pop up for the user to choose. In another embodiment, when the smart speaker is used for control, the user needs to manually set in advance which room the speaker is in and which room the air conditioner is in. When the user gives the smart speaker a voice command to control the air conditioner, the smart speaker may know which air conditioner to control based on the location information set in advance.

Figure 2:
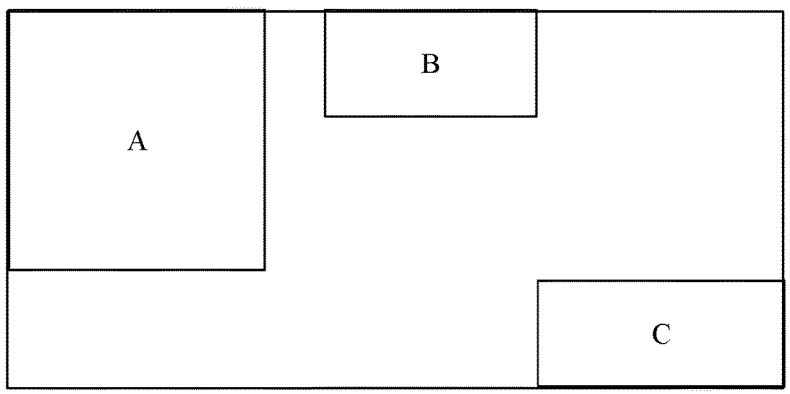
FIG. 2 is an example diagram of a location of the main control device and the controlled device in the space.

FIG. 2 is an example diagram of the location of the main control device and the controlled devices in the space. As shown in FIG. 2, there are 3 rooms (Room A, Room B, and Room C) in the house, and each room has an air conditioning. When the user is closest to Room C, he/she may turn on or off the air conditioner closest to the user simply by the instruction of "turn on (turn off) the air conditioner", without selecting "Turn on the air conditioner in Room C" or configuring the location information of the smart speaker and the air conditioner in advance by the user.

It may be understood that, in the embodiments of the disclosure, the main control device receives the control instruction, sends the first signal to each candidate controlled device, and receives the second signal including the transmit power value of the second signal fed back by each candidate controlled device. Therefore, according to the received power values and the transmit power values of the second signals, the candidate controlled device corresponding to the minimum signal attenuation value is determined as the target controlled device, and the control instruction is sent to the target controlled device. Since the candidate controlled device corresponding to the minimum signal attenuation value is the device closest to the main control device, the nearby control can be achieved through the solution of the disclosure, without the user manually selecting the controlled device or configuring the location information in advance. Therefore, the control intelligence of the Internet of Things devices is improved, and the user experience is improved.

Figure 3:
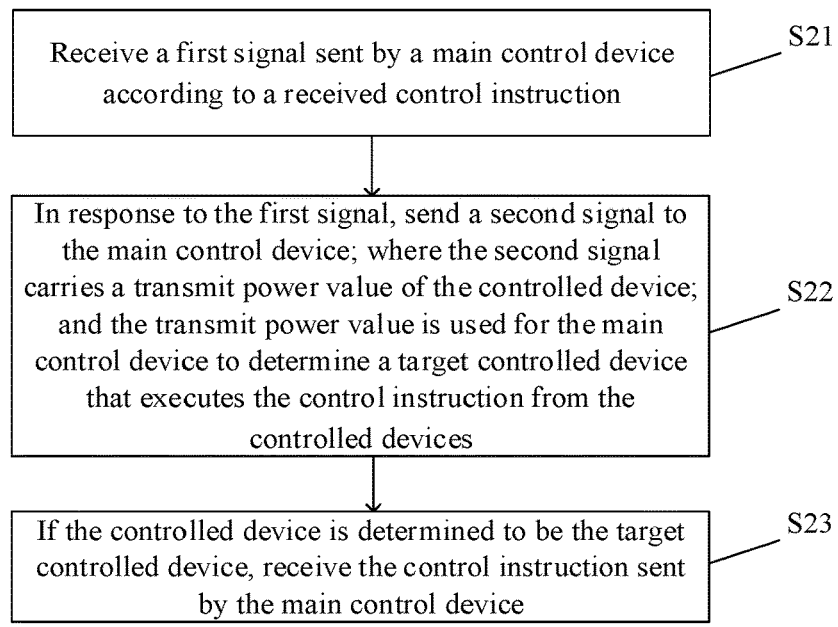
FIG. 3 is a second flowchart of a device control method shown in an embodiment of the disclosure.

FIG. 3 is a second flowchart of a device control method shown in an embodiment of the disclosure, which is applied to a controlled device. As shown in FIG. 3, the device control method applied to the controlled device includes the following steps.

In S21, a first signal sent by a main control device according to a received control instruction is received.

In S22, in response to the first signal, a second signal is sent to the main control device; where the second signal carries a transmit power value of the controlled device; and the transmit power value is used for the main control device to determine a target controlled device that executes the control instruction from the controlled devices.

In S23, if the controlled device is determined to be the target controlled device, the control instruction sent by the main control device is received.

In the embodiments of the disclosure, the controlled device may be any device in the same indoor environment as the main control device. In step S21, the controlled device may receive the first signal sent by the main control device according to the control instruction, where the control instruction may be a control instruction generated based on a user's manual operation, or may be a user's voice instruction.

In step S22, the controlled device sends a second signal in response to the first signal to the main control device, and the second signal carries the transmit power value of the controlled device, so that the main control device can determine the target controlled device for executing the control instruction. In step S23, if the controlled device is determined to be the target controlled device, the control instruction sent by the main control device is received.

As mentioned earlier, when the signal is transmitted in the transmission medium, there will be signal attenuation. The degree of signal attenuation is usually related to the transmission distance. The longer the transmission distance is, the larger the attenuation may be, and the shorter the transmission distance is, the smaller the attenuation may be. Therefore, in the disclosure, through sending the second signals to the main control device by the controlled devices and carrying the transmit power values of the second signals, the main control device can determine the controlled device closer to itself based on the transmit power values. The controlled device closer to the controlled device is the target controlled device.

In an embodiment, receiving the first signal sent by the main control device according to the received control instruction includes:

receiving the first signal sent by the main control device according to the received control instruction through an access gateway between the main control device and the controlled device.

In the embodiment of the disclosure, the main control device and the controlled device may access the same local area network through the access gateway, and thus the controlled device may receive the first signal sent by the main controlled device through the access gateway. For example, the access gateway is a router or other network device that can provide network access functions.

It should be noted that in the embodiments of the disclosure, the controlled device receiving the first signal sent by the main control device is not limited to the way of using the access gateway. For example, the controlled device and the main control device may also communicate based on Bluetooth communication, Wi-Fi direct connection or D2D communication and other methods.

In an embodiment, the first signal includes a discovery request signal; the second signal includes a discovery response signal.

Based on the first signal being a discovery request signal, the controlled device may send a discovery response signal to the main control device based on the end-to-end device communication mode, that is, the discovery response signal is a signal directly fed back to the main control device without being transferred by a transfer device when responding to the first signal by the candidate controlled device.

It should be noted that, in the embodiments of the disclosure, if the controlled device receives the first signal sent by the main control device using the access gateway relay mode, after the controlled device receives the first signal whose type is the discovery request signal, it may switch to the end-to-end device communication mode to feed back the second signal to the main control device, and the main control device also switches to the end-to-end mode to receive the second signal.

In an embodiment, the discovery request signal is a discovery request signal of Wi-Fi direct communication; the discovery response signal is a discovery response signal of Wi-Fi direct communication;

or, the discovery request signal is a discovery request signal of D2D communication; the discovery response signal is a discovery response signal of D2D communication.

In this embodiment, the discovery request signal is the discovery request signal of Wi-Fi direct communication, and the discovery response signal is the discovery response signal of Wi-Fi direct communication, that is, the main control device and the candidate controlled devices may perform communication based on Wi-Fi direct connection technology, and the main control device obtains the second signal sent by the candidate controlled device based on Wi-Fi direct connection.

The discovery request signal may also be the discovery request signal of D2D communication, and the discovery response signal is the discovery response signal of D2D communication, that is, the main control device and the candidate controlled devices may perform device-to-device communication based on D2D communication technology, and the main control device obtains the second signals sent by the candidate controlled devices based on the D2D communication.

It is understandable that, in the embodiments of the disclosure, the controlled device may receive the first signal sent by the main control device according to the received control instruction, and feed back to the main control device the second signal including the transmit power value of the second signal. In this way, the main control device can determine the target controlled device, and if the controlled device is determined to be the target controlled device, it receives the control instruction sent by the main control device. Through the solution of the disclosure, nearby control can be realized without the user manually selecting the controlled device and configuring the location information in advance, to improve the control intelligence of the Internet of Things device and improving the user experience.

Figure 4:
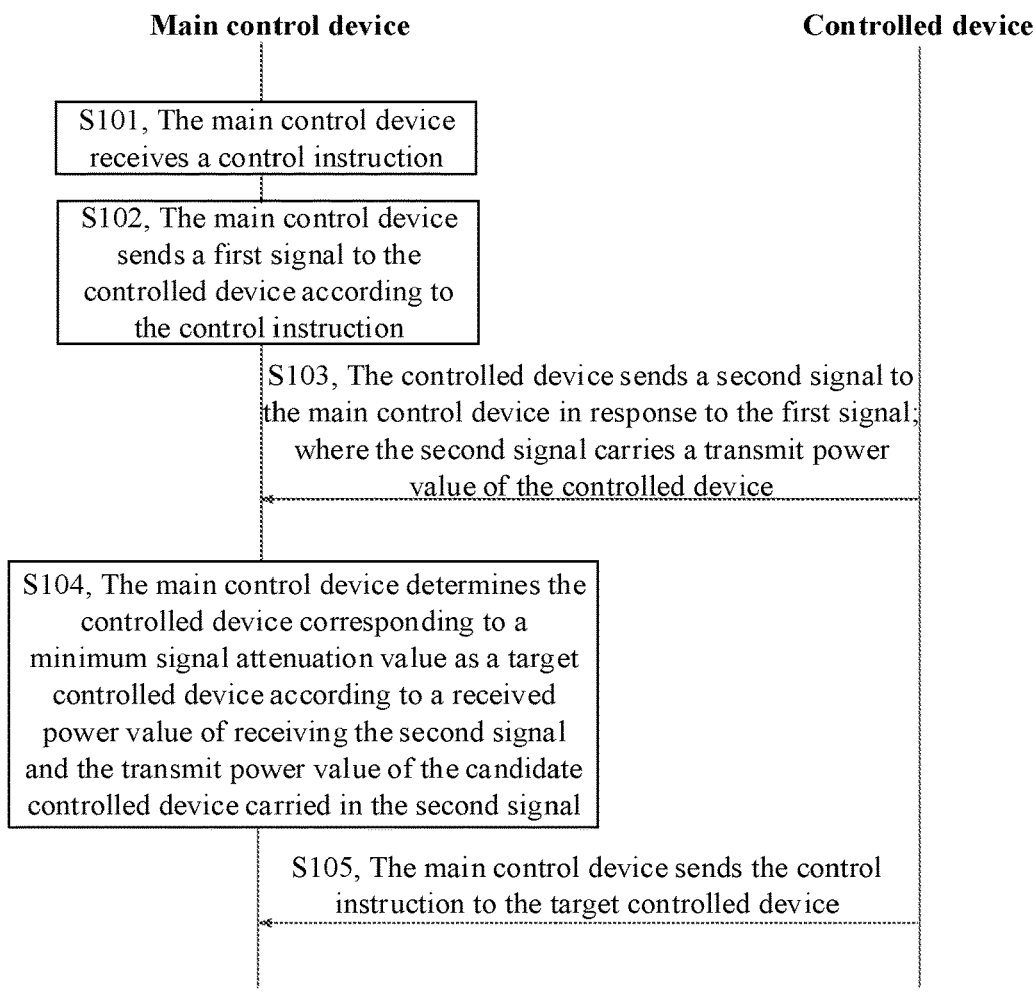
FIG. 4 is a flow interaction diagram of a device control method shown in an embodiment of the disclosure.

FIG. 4 is a flow interaction diagram of a device control method shown in an embodiment of the disclosure. As shown in FIG. 4, the device control method is applied to a main control device and a controlled device, and includes the following steps.

In S101, the main control device receives a control instruction.

In S102, the main control device sends a first signal to the controlled device according to the control instruction.

In S103, the controlled device sends a second signal to the main control device in response to the first signal; where the second signal carries a transmit power value of the controlled device.

In S104, according to a received power value of receiving the second signal and the transmit power value of the candidate controlled device carried in the second signal, the main control device determines the controlled device corresponding to the minimum signal attenuation value as the target controlled device.

In S105, the main control device sends the control instruction to the target controlled device.

It is understandable that, in the embodiments of the disclosure, the main control device receives the control instruction, sends the first signal to each controlled device, and receives the second signal including the second signal transmit power value fed back by each controlled device. Therefore, according to the received power values and the transmit power values of the second signals, the candidate controlled device corresponding to the minimum signal attenuation value is determined as the target controlled device, and the control instruction is sent to the target controlled device. Since the candidate controlled device corresponding to the minimum signal attenuation value is the device closest to the main control device, the nearby control can be achieved through the solution of the disclosure, without the user manually selecting the controlled device or configuring the location information in advance. Therefore, the user experience can be improved.

Figure 5:
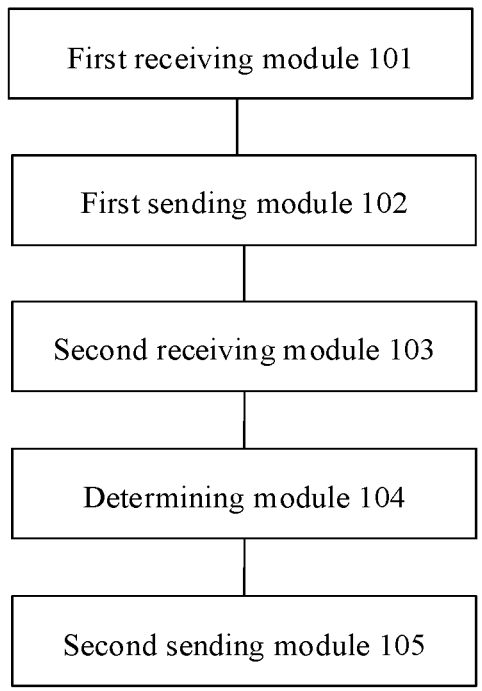
FIG. 5 is an apparatus diagram of a main control device in an embodiment of the disclosure.

FIG. 5 is an apparatus diagram of a main control device in an embodiment of the disclosure. Referring to FIG. 5, which is applied to the main control device, the apparatus includes:
  a first receiving module 101, configured to receive a control instruction;
  a first sending module 102, configured to send a first signal to candidate controlled devices according to the control instruction;
  a second receiving module 103, configured to receive second signals sent by the candidate controlled devices in response to the first signal; where the second signals carry transmit power values of the candidate controlled devices;
  a determining module 104, configured to determine a candidate controlled device corresponding to a minimum signal attenuation value to be a target controlled device according to received power values of the second signals received by the main control device and the transmit power values of the candidate controlled devices carried in the second signals; and
  a second sending module 105, configured to send the control instruction to the target controlled device.

In some embodiments, the determining module 104 is specifically configured to determine a difference between the transmit power values and the received power values; and determine the candidate controlled device corresponding to the smallest difference as the target controlled device.

In some embodiments, the first signal includes: a discovery request signal; and the second signal includes: a discovery response signal.

In some embodiments, the discovery request signal is a discovery request signal of Wi-Fi direct communication; the discovery response signal is a discovery response signal of Wi-Fi direct communication;
  or,
  the discovery request signal is a discovery request signal of D2D communication; the discovery response signal is a discovery response signal of D2D communication.

In some embodiments, the first sending module 102 is specifically configured to send the first signal to the candidate controlled devices through access gateways between the main control device and the candidate controlled devices.

In some embodiments, the second sending module 105 is specifically configured to send the control instruction to the target controlled device according to a device identifier of the target controlled device.

In some embodiments, the control instruction carries indication information that represents a device type; and
  the first sending module 102 is specifically configured to send the first signal to a candidate controlled device corresponding to the device type represented by the indication information according to the indication information carried in the control instruction.

Figure 6:
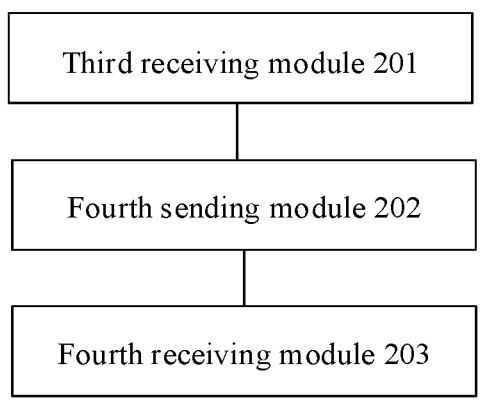
FIG. 6 is an apparatus diagram of a controlled device in an embodiment of the disclosure.

FIG. 6 is an apparatus diagram of a controlled device in an embodiment of the disclosure. Referring to FIG. 6, which is applied to controlled device, the apparatus includes:
  a third receiving module 201, configured to receive a first signal sent by a main control device according to a received control instruction;
  a fourth sending module 202, configured to send a second signal to the main control device in response to the first signal; where the second signal carries a transmit power value of the controlled device; and the transmit power value is used by the main control device to determine a target controlled device that executes the control instruction from the controlled devices; and
  a fourth receiving module 203, configured to receive the control instruction sent by the main control device if the controlled device is determined to be the target controlled device.

In some embodiments, the third receiving module 201 is specifically configured to receive, through an access gateway between the main control device and the controlled device, the first signal sent by the main control device according to the received control instruction.

In some embodiments, the first signal includes: a discovery request signal; and the second signal includes: a discovery response signal.

In some embodiments, the discovery request signal is a discovery request signal of Wi-Fi direct communication; the discovery response signal is a discovery response signal of Wi-Fi direct communication;
  or,
  the discovery request signal is a discovery request signal of D2D communication; the discovery response signal is a discovery response signal of D2D communication.

Regarding the apparatuses in the embodiments shown in FIG. 5 and FIG. 6, the specific manner of performing operations of each module has been described in detail in the embodiments of the method, and detailed description will not be given here.

Figure 7:
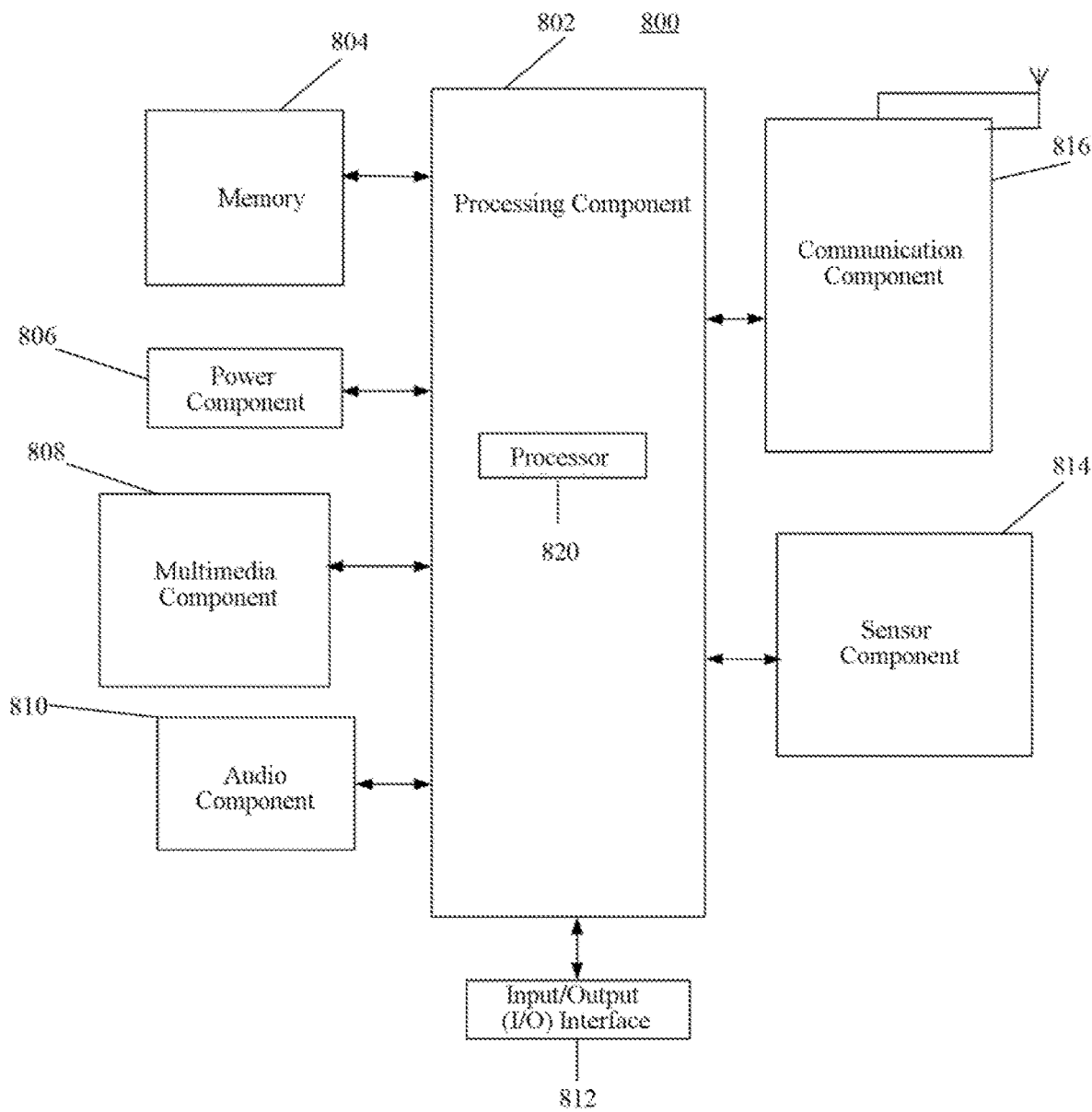
FIG. 7 is a block diagram of a device shown in an embodiment of the disclosure.

FIG. 7 is a block diagram showing an apparatus 800 according to an embodiment. For example, the apparatus 800 may be a main control device such as a smart phone or a smart speaker, and may also be a controlled device such as a smart air conditioner or a smart curtain.

Referring to FIG. 7, the apparatus 800 may include one or more of the following components: a processing component 802, a memory 804, a power component 806, a multimedia component 808, an audio component 810, an input/output (I/O) interface 812, a sensor component 814 and a communication component 816.

The processing component 802 typically controls overall operations of the apparatus 800, such as the operations associated with display, telephone calls, data communications, camera operations and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the apparatus 800. Examples of such data include instructions for any applications or methods operated on the apparatus 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or an optical disk.

The power component 806 provides power to various components of the apparatus 800. The power component 806 may include a power management system, one or more power sources, and any other components associated with the generation, management, and distribution of power in the apparatus 800.

The multimedia component 808 includes a screen providing an output interface between the apparatus 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the apparatus 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the apparatus 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the apparatus 800. For instance, the sensor component 814 may detect an open/closed status of the apparatus 800, relative positioning of components, e.g., the display and the keypad, of the apparatus 800, a change in position of the apparatus 800 or a component of the apparatus 800, a presence or absence of user contact with the apparatus 800, an orientation or an acceleration/deceleration of the apparatus 800, and a change in temperature of the apparatus 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the apparatus 800 and other devices. The apparatus 800 may access a wireless network based on a communication standard, such as WiFi, 2G, or 3G, or a combination thereof. In one embodiment, the communication component 816 receives a broadcast signal or broadcast associated information from an external broadcast management system via a broadcast channel. In one embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In embodiments, the apparatus 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above-described methods.

In embodiments, there is also provided a non-transitory computer-readable storage medium including instructions, such as included in the memory 804, executable by the processor 820 in the apparatus 800, for performing the above-described methods. For example, the non-transitory computer-readable storage medium may be a ROM, a random access memory (RAM), a CD-ROM, a magnetic tape, a floppy disc, an optical data storage device, and the like.

There is provided a non-transitory computer-readable storage medium, when instructions in the storage medium are executed by a processor of a main control device, the main control device is enabled to execute a device control method, the method including:

receiving a control instruction;

sending a first signal to candidate controlled devices according to the control instruction;

receiving second signals sent by the candidate controlled devices in response to the first signal; the second signals carry transmit power values of the candidate controlled devices;

determining a candidate controlled device corresponding to a minimum signal attenuation value as a target controlled device according to received power values for receiving the second signals by the main control device and the transmit power values of the candidate controlled devices carried in the second signals; and sending the control instruction to the target controlled device.

Alternatively, when the instructions in the storage medium are executed by a processor of a controlled device, the controlled device is enabled to execute the device control method, and the method includes:

receiving a first signal sent by a main control device according to a received control instruction;

in response to the first signal, sending a second signal to the main control device; the second signal carries a transmit power value of the controlled device; and the transmit power value is used by the main control device to determine a target controlled device that executes the control instruction from the controlled devices; and when the controlled device is determined to be the target controlled device, receiving the control instruction sent by the main control device.

Other embodiments of the disclosure will be apparent to those skilled in the art from consideration of the specification and practice of the disclosure disclosed here. The disclosure is intended to cover any variations, uses, or adaptations of the disclosure following the general principles thereof and including such departures from the disclosure as come within known or customary practice in the art.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

The disclosure provides a device control method and apparatus, a device, and a storage medium.

According to an aspect of the disclosure, there is provided a device control method, which is applied to a main control device and includes:

receiving a control instruction;

sending a first signal to candidate controlled devices according to the control instruction;

receiving second signals sent by the candidate controlled devices in response to the first signal; the second signals carry transmit power values of the candidate controlled devices;

determining a candidate controlled device corresponding to a minimum signal attenuation value as a target controlled device according to received power values for receiving the second signals by the main control device and the transmit power values of the candidate controlled devices carried in the second signals; and sending the control instruction to the target controlled device.

In some embodiments, determining the candidate receiving device corresponding to the minimum signal attenuation value as the target controlled device according to the received power values for receiving the second signals by the main control device and the transmit power values of the candidate controlled devices carried in the second signals, includes:

determining differences between the transmit power values and the received power values; and determining a candidate controlled device corresponding to a smallest difference as the target controlled device.

In some embodiments, the first signal includes: a discovery request signal; and the second signal includes: a discovery response signal.

In some embodiments, the discovery request signal is a discovery request signal of Wi-Fi direct communication; and the discovery response signal is a discovery response signal of Wi-Fi direct communication;

or, the discovery request signal is a discovery request signal of D2D communication; and the discovery response signal is a discovery response signal of D2D communication.

In some embodiments, sending the first signal to the candidate controlled devices includes:

sending the first signal to the candidate controlled devices through access gateways between the main control device and the candidate controlled devices.

In some embodiments, the main control device stores device identifiers of the candidate controlled devices, and sending the control instruction to the target controlled device includes:

sending the control instruction to the target controlled device according to the device identifier of the target controlled device.

In some embodiments, the control instruction carries indication information that represents a device type; and sending the first signal to the candidate controlled devices according to the control instruction includes:

sending the first signal to the candidate controlled devices corresponding to the device type represented by the indication information according to the indication information carried in the control instruction.

According to an aspect of the disclosure, there is provided a device control method, which is applied to a controlled device and includes:

receiving a first signal sent by a main control device according to a received control instruction;

in response to the first signal, sending a second signal to the main control device; the second signal carries a transmit power value of the controlled device; and the transmit power value is used by the main control device to determine a target controlled device that executes the control instruction from the controlled devices; and when the controlled device is determined to be the target controlled device, receiving the control instruction sent by the main control device.

In some embodiments, receiving the first signal sent by the main control device according to the received control instruction includes:

receiving the first signal sent by the main control device according to the received control instruction through an access gateway between the main control device and the controlled device.

In some embodiments, the first signal includes: a discovery request signal; and the second signal includes: a discovery response signal.

In some embodiments, the discovery request signal is a discovery request signal for Wi-Fi direct communication; and the discovery response signal is a discovery response signal for Wi-Fi direct communication;

or, the discovery request signal is a discovery request signal of D2D communication; and the discovery response signal is a discovery response signal of D2D communication.

According to an aspect of the disclosure, there is provided a control apparatus, which is applied to a main control device, and the apparatus includes:

a first receiving module, configured to receive a control instruction;

a first sending module, configured to send a first signal to candidate controlled devices according to the control instruction;

a second receiving module, configured to receive second signals sent by the candidate controlled devices in response to the first signal; the second signals carry transmit power values of the candidate controlled devices;

a determining module, configured to determine a candidate controlled device corresponding to a minimum signal attenuation value as a target controlled device according to received power values for receiving the second signals by the main control device and the transmit power values of the candidate controlled devices carried in the second signals; and a second sending module, configured to send the control instruction to the target controlled device.

In some embodiments, the determining module is specifically configured to determine differences between the transmit power values and the received power values; and determine a candidate controlled device corresponding to a smallest difference as the target controlled device.

In some embodiments, the first signal includes: a discovery request signal; and the second signal includes: a discovery response signal.

In some embodiments, the discovery request signal is: a discovery request signal of Wi-Fi direct communication; and the discovery response signal is: a discovery response signal of Wi-Fi direct communication;

or, the discovery request signal is a discovery request signal of D2D communication; and the discovery response signal is a discovery response signal of D2D communication.

In some embodiments, the first sending module is specifically configured to send the first signal to the candidate controlled devices through access gateways between the main control device and the candidate controlled devices.

In some embodiments, the second sending module is specifically configured to send the control instruction to the target controlled device according to a device identifier of the target controlled device.

In some embodiments, the control instruction carries indication information that represents a device type; and the first sending module is specifically configured to send the first signal to the candidate controlled devices corresponding to the device type represented by the indication information according to the indication information carried in the control instruction.

According to an aspect of the disclosure, there is provided a control apparatus, which is applied to a controlled device and includes:

a third receiving module, configured to receive a first signal sent by a main control device according to a received control instruction;

a fourth sending module, configured to send a second signal to the main control device in response to the first signal; the second signal carries a transmit power value of the controlled device; and the transmit power value is used by the main control device to determine a target controlled device that executes the control instruction from the controlled devices; and a fourth receiving module, configured to, when the controlled device is determined to be the target controlled device, receive the control instruction sent by the main control device.

In some embodiments, the third receiving module is specifically configured to receive the first signal sent by the main control device according to the received control instruction through an access gateway between the main control device and the controlled device.

In some embodiments, the first signal includes: a discovery request signal; and the second signal includes: a discovery response signal.

In some embodiments, the discovery request signal is a discovery request signal of Wi-Fi direct communication; and the discovery response signal is a discovery response signal of Wi-Fi direct communication;

or, the discovery request signal is a discovery request signal of D2D communication; and the discovery response signal is a discovery response signal of D2D communication.

According to an aspect of the disclosure, there is provided a device, the device including:

a processor; and a memory for storing instructions executable by the processor;

the processor is configured to execute the device control method according to the first aspect or the second aspect described above.

According to an aspect of the disclosure, there is provided a storage medium, including:

when instructions in the storage medium are executed by a processor of a main control device, the main control device can execute the device control method as described in the first aspect; or, when instructions in the storage medium are controlled by a processor of a controlled device, the controlled device can execute the device control method described in the second aspect.

The technical solutions provided by the embodiments of the disclosure may include the following beneficial effects.

In the embodiments of the disclosure, the main control device receives the control instruction, sends the first signal to each candidate controlled device, and receives the second signal including the second signal transmit power value fed back by each candidate controlled device, then the main control device determines the candidate controlled device corresponding to the minimum signal attenuation value as the target controlled device according to the received power values and the transmit power values of the second signals, and sends the control instruction to the target controlled device. Since the candidate controlled device corresponding to the minimum signal attenuation value is the device closest to the main control device, the nearby control can be achieved through the solution of the disclosure, without manually selecting the controlled device or configuring the location information in advance by the user. Therefore, the control intelligence of the Internet of Things devices is improved, and the user experience is improved.

What is claimed is:

1. A device control method, comprising:

receiving, by a main control device, a control instruction;

sending, by the main control device, a first signal to candidate controlled devices according to the control instruction;

receiving, by the main control device, second signals sent by the candidate controlled devices in response to the first signal, wherein the second signals carry transmit power values of the candidate controlled devices;

determining, by the main control device, a candidate controlled device corresponding to a minimum signal attenuation value as a target controlled device according to received power values for receiving the second signals by the main control device and the transmit power values of the candidate controlled devices carried in the second signals; and sending, by the main control device, the control instruction to the target controlled device.

2. The method according to claim 1, wherein determining the candidate receiving device corresponding to the minimum signal attenuation value as the target controlled device according to the received power values for receiving the second signals by the main control device and the transmit power values of the candidate controlled devices carried in the second signals, comprises:
 determining differences between the transmit power values and the received power values; and
 determining a candidate controlled device corresponding to a smallest difference as the target controlled device.

3. The method according to claim 1, wherein the first signal comprises a discovery request signal, and the second signal comprises a discovery response signal.

4. The method according to claim 3, wherein the discovery request signal is a discovery request signal of Wi-Fi direct communication, and the discovery response signal is a discovery response signal of Wi-Fi direct communication.

5. The method according to claim 3, wherein the discovery request signal is a discovery request signal of device-to-device (D2D) communication, and the discovery response signal is a discovery response signal of D2D communication.

6. The method according to claim 1, wherein sending the first signal to the candidate controlled devices comprises:
 sending the first signal to the candidate controlled devices through access gateways between the main control device and the candidate controlled devices.

7. The method according to claim 1, wherein the main control device stores device identifiers of the candidate controlled devices, and sending the control instruction to the target controlled device comprises:
 sending the control instruction to the target controlled device according to a device identifier of the target controlled device.

8. The method according to claim 1, wherein the control instruction carries indication information that represents a device type; and
 sending the first signal to the candidate controlled devices according to the control instruction comprises:
 sending the first signal to the candidate controlled devices corresponding to the device type represented by the indication information according to the indication information carried in the control instruction.

9. A device control method, comprising:
 receiving, by a controlled device, a first signal sent by a main control device according to a received control instruction;
 in response to the first signal, sending, by the controlled device, a second signal to the main control device, wherein the second signal carries a transmit power value of the controlled device; and the transmit power value is used by the main control device in conjunction with a received power value for receiving the second signal to determine a target controlled device that executes the control instruction from a plurality of controlled devices, wherein the target controlled device corresponds to a minimum signal attenuation value of signal attenuation values of the plurality of controlled devices; and
 in response to determining that the controlled device is the target controlled device, receiving, by the control device, the control instruction sent by the main control device.

10. The method according to claim 9, wherein receiving the first signal sent by the main control device according to the received control instruction comprises:
 receiving the first signal sent by the main control device according to the received control instruction through an access gateway between the main control device and the controlled device.

11. A device control apparatus, applied to a main control device, comprising:
 a processor; and
 a memory for storing instructions executable by the processor;
 wherein the processor is configured to:
 receive a control instruction;
 send a first signal to candidate controlled devices according to the control instruction;
 receive second signals sent by the candidate controlled devices in response to the first signal, wherein the second signals carry transmit power values of the candidate controlled devices;
 determine a candidate controlled device corresponding to a minimum signal attenuation value as a target controlled device according to received power values for receiving the second signals by the main control device and the transmit power values of the candidate controlled devices carried in the second signals; and
 send the control instruction to the target controlled device.

12. The apparatus according to claim 11, wherein
 the processor is further configured to determine differences between the transmit power values and the received power values and determine a candidate controlled device corresponding to a smallest difference as the target controlled device.

13. The apparatus according to claim 11, wherein the first signal comprises a discovery request signal, and the second signal comprises a discovery response signal.

14. The apparatus according to claim 13, wherein the discovery request signal is a discovery request signal of Wi-Fi direct communication, and the discovery response signal is a discovery response signal of Wi-Fi direct communication.

15. The apparatus according to claim 13, wherein the discovery request signal is a discovery request signal of device-to-device (D2D) communication, and the discovery response signal is a discovery response signal of D2D communication.

16. The apparatus according to claim 11, wherein
 the processor is further configured to send the first signal to the candidate controlled devices through access gateways between the main control device and the candidate controlled devices.

17. The apparatus according to claim 11, wherein the main control device stores device identifiers of the candidate controlled devices, and
 the processor is further configured to send the control instruction to the target controlled device according to a device identifier of the target controlled device.

18. The apparatus according to claim 11, wherein the control instruction carries indication information that represents a device type; and
 the processor is further configured to send the first signal to the candidate controlled devices corresponding to the device type represented by the indication information according to the indication information carried in the control instruction.

19. A device control apparatus, applied to a controlled device, comprising:
 a processor; and
 a memory for storing instructions executable by the processor;

wherein the processor is configured to:

receive a first signal sent by a main control device according to a received control instruction;

send a second signal to the main control device in response to the first signal, wherein the second signal carries a transmit power value of the controlled device, and the transmit power value is used by the main control device in conjunction with a received power value for receiving the second signal to determine a target controlled device that executes the control instruction from a plurality of controlled devices, wherein the target controlled device corresponds to a minimum signal attenuation value of signal attenuation values of the plurality of controlled devices; and in response to determining that the controlled device is the target controlled device, receive the control instruction sent by the main control device.

20. The apparatus according to claim 19, wherein the processor is further configured to receive the first signal sent by the main control device according to the received control instruction through an access gateway between the main control device and the controlled device.

\* \* \* \* \*